United States Patent [19]

de Vries et al.

[11] Patent Number: 4,708,656

[45] Date of Patent: Nov. 24, 1987

[54] SIMULATOR OF MECHANICAL PROPERTIES OF A STEERING SYSTEM

[75] Inventors: Luitzen de Vries, Amstelveen; Gerhard J. Wierda, Lisserbroek, both of Netherlands

[73] Assignee: Fokker B.V., Netherlands

[21] Appl. No.: 826,029

[22] Filed: Feb. 4, 1986

[30] Foreign Application Priority Data

Nov. 11, 1985 [NL] Netherlands .......................... 8503096

[51] Int. Cl.[4] .............................................. G09B 9/08
[52] U.S. Cl. ........................................ 434/45; 434/29
[58] Field of Search ..................................... 434/45, 29

[56] References Cited

U.S. PATENT DOCUMENTS 4,398,889  8/1983  Lam et al. ............................. 434/45

Primary Examiner—Leo P. Picard
Attorney, Agent, or Firm—John P. Snyder

[57] ABSTRACT

A simulator of previously chosen mechanical properties of the steering system of a device such as an aircraft employs a controllable limiter for simulating the mechanical Coulomb friction of the control member and is arranged in a negative feedback loop and having two control signal inputs which determine the maximum and minimum outputs of the limiter in association with a further input signal corresponding to the friction concerning the control member. The limiter interrupts output until the level of the Coulomb friction to be simulated is exceeded.

20 Claims, 6 Drawing Figures

SIMULATOR OF MECHANICAL PROPERTIES OF A STEERING SYSTEM

The invention relates to a simulator of previously chosen mechanical properties of the steering system of a transport-means, e.g. an airplane or a vehicle, said simulator comprising:

(1) a first element whose position may changed during a trip, such as a control-member, e.g. a control-column, with which by means of coupling-means such as a cable a second element, such as a steering surface, is coupled;

(2) an associated, programmable servo-means coupled with the or each element, comprising:
  (a) an amplifier;
  (b) a servo-motor coupled with the output thereof;
  (c) a force-electric signal transducer arranged between the servo-motor and the element and having its output coupled with a first input of the amplifier;
  (d) a position-electric signal transducer arranged on the element and having its output coupled with a second input of the amplifier; and
  (e) a computer which calculates a force associated with the condition of the element and applies a corresponding signal to the amplifier on the basis of the flight conditions and the relevart properties of the or each element, said computer being coupled with the amplifier through an electric analogon representing the relevant mechanical properties of the element concerned, said analogon comprising:
    (1) a divider for dividing the input signal by a value proportional with the desired mass of the element;
    (2) a first integrator connected to the output of the divider; and
    (3) a second integrator connected to the output of the first integrator, the output of said second integrator being coupled with the input of the amplifier.

Such a simulator can find application e.g. as a flight simulator in the framework of a training program for pilots. In case of a fully servo-controlled airplane it can be used in the plane itself in order to give the pilot the feeling as steering a usual airplane.

The Dutch patent application No. 8,501,271 not published previously, in the name of the present applicants, in which reference is made to applicants U.S. Pat. No. 4,398,889, describes a flight-simulator capable of simulating virtually all practical systems without imposing limitations to the order of the mechanical system to be simulated.

A difficulty up till now not solved in simulating the so called "forward"-system is that the Coulomb-friction cannot be realised without the occurrence of problems in relation to stability and/or drift.

The invention according to the above-mentioned older publication U.S. Pat. No. 4,398,889 was based upon the wish to embody digitally as many elements of the flight-simulator as possible, as a digital embodiment has the advantage of a larger flexibility and besides is not subjected to drift. With reference to FIG. 1 of this American patent specification, particularly the negative-feedback circuit 51, 52, 53, 54, namely the friction simulation in the "aft"-system, it is remarked that the negative-feedback loop, consisting of differentiator 52 and amplifier 53, has a differentiating operation that can practically not be realised digitally. This circuit 51, 52, 53, 54, therefore, is not simply adaptable for application in the forward-system that is represented by block 132. There integrators 41 and 42, the latter if necessary in accordance with Dutch patent application No. 8,501,271 in digital form, are necessary, as therein the mass is represented necessary for control of the linear hydraulic motor 28.

The invention, now, proposes to use in a simulator of the type mentioned means for simulating the mechanical Coulomb-friction of the first element, said means being engineerd as a controllable limiter arranged in a negative-feedback loop between the output of the first integrator and the input of the divider and provided with two control-inputs for supplying two control-signals determining the maximum and the minimum output-signals, respectively, of the limiter, said two control-signals corresponding with the sum and the difference, respectively, of a force-signal and a signal corresponding to the friction-force, supplied to the analogon. The through-circuit is interrupted by the controllable limiter until the level of the Coulomb-friction to be simulated is exceeded.

The attention is drawn to the fact that the above explanation in relation to U.S. patent specification 4,398,889 and Dutch patent application No. 8,501,271 only serve the purpose of an introduction to a correct understanding of the invention, but that the present invention can find a more general application than in a flight-simulator.

In order to make the friction simulation as faithful as possible, that variant is preferred, of which the negative-feedback loop comprises an amplifier. In a practical embodiment very good results have been obtained with a gain factor of minimally about 10.

In a preferred embodiment the limiter is engineered as two diode-circuits arranged in series and reverse biased between the control inputs for the minimum-signal and the maximum-signal, respectively, the junction of said diode-circuits being connected with the divider and with a resistor, which is, with its other end, coupled with the output of the first integrator. In this preferred embodiment advantageously use may be made of diode-circuits which are each engineered as an operational amplifier with a diode arranged in the negative-feedback loop.

It is true, in the case in which the second integrator is of the analogue type, on short term a perfectly faithful friction simulation can be realised, however, the problem of the drift is not yet solved. In this connection advantageously use may be made of a further embodiment characterized in that the computer is of the digital type and that the output of the first integrator is connected, through an analogue/digital converter, with an input of the computer and that the or each related output of the computer is, through a digital/analogue, converter, connected with the electric analogon.

It should be understood that the term "computer" should be interpreted in a broader sense than the unit referred to as such in the above-mentioned US patent specification. This aspect will be considered hereinafter with reference to FIG. 1.

Also the output of the second integrator may be connected with the computer through an analogue/digital converter. This solution within the framework of the invention, however, has a certain limitation. As a result of the limited resolution of this analogue/digital-converter at the output the well-known quantization-noise occurs. This noise may manifest itself in the simulation in a perceptible way, which is not in correspondence with the requirement of a fully faithful simulation. In order to solve this problem the invention proposes a variant, which is characterized in that the second integrator is of the digital type, is, with its input, connected with the output of the analogue/digital converter and is connected with its output, through a digital/analogue converter, with an input of the computer and an input of the amplifier. It will, now, be clear that the quantization-noise at the output of the analogue/digital converter at the output of the first integrator still exists. As a result of the fact that an integrator can be considered as a filter having a slope of 6 dB/octave the noise is now filtered. Amplification of the position-signal thus obtained appears not to cause perceptible quantization-noise.

The invention will now be explained with reference to a drawing. In the drawing:

FIG. 1 shows the prior art flight simulation according to patent specification U.S. Pat. No. 4,398,889;

Figure 1:
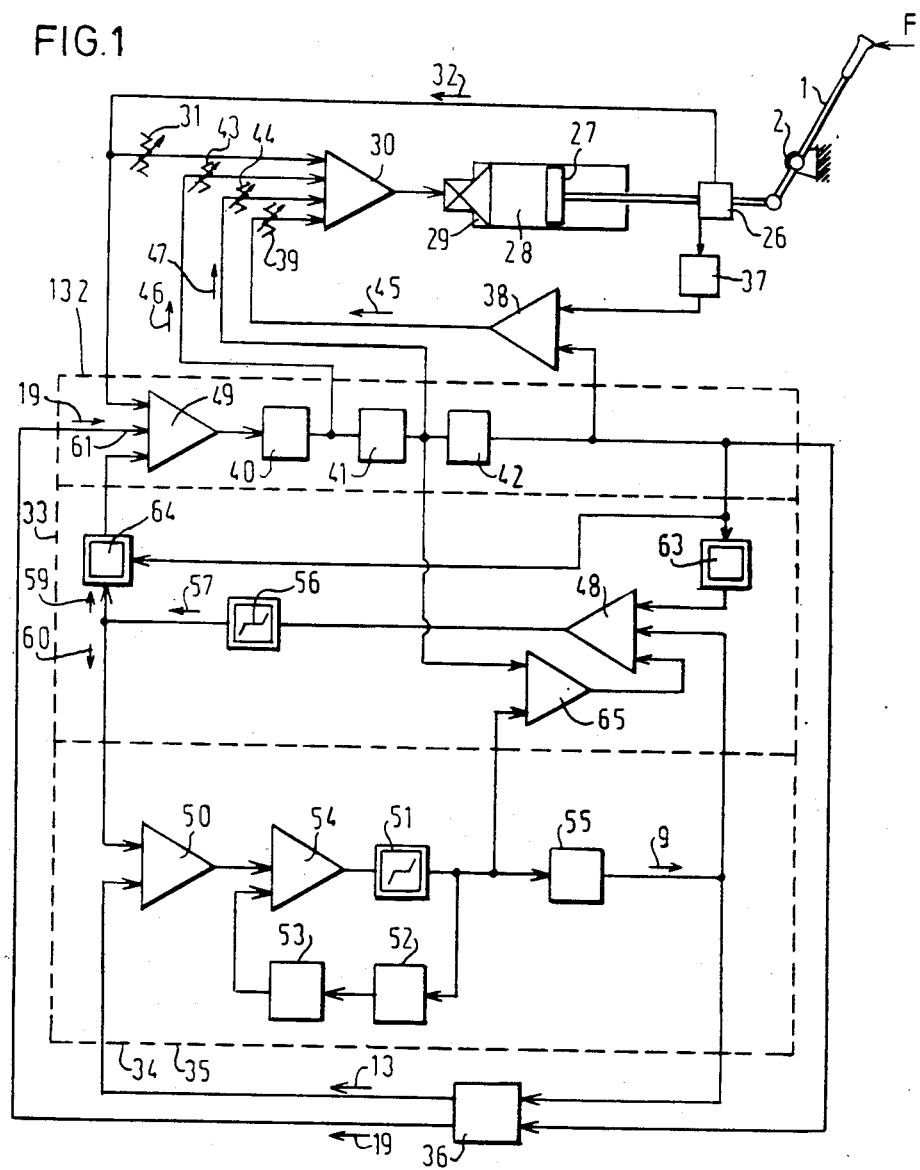

FIG. 1 shows an embodiment of a fourth order flight simulator in accordance with the invention. The pilot exerts a force F on the control-column 1, which is coupled through the fulcrum 2 and a power pick-up 26 with the piston 27 of the linear hydraulic motor 28, the servo-valve 29 of which can be controlled from the amplifier 30. The force-electric signal converter 26 is connected through a potentiometer 31 to an inverting input of the amplifier 30. Without further explanation it will be obvious that the loop described constitutes a force-servo-loop or a force-negative feedback loop. The force pick-up 26 provides a signal 32 corresponding to the measured force. In this way static load errors which may be due to the compressibility of the oil employed are corrected. The signal 32 is also applied to a block 132 representing an electrical analogon or substitute diagram of the forward system 6.

As will be described in further detail the analogon 132 is connected with an analogon 33 representing the properties of the coupling 4. This analogon 33, in turn, is connected with an analogon 34 representing the properties of the aft system 7. It should be emphasized that the analogon 34 may be formed by a number of blocks 35 corresponding to the order of the aft system to be simulated, each block representing in itself a second order system as will be discussed hereinafter with reference to FIG. 7. Thus, by cascading any desired order of the aft system can be obtained. The "lower" block 35 of the analogon 34 is connected to a computer 36, which serves for the simulation of the flight conditions.

With the control-column 1 is furthermore coupled a position-electric signal converter 37, the output of which is connected through an amplifier 38 and a potentiometer 39 to an input of the amplifier 30.

The analogon 132 of the forward system comprises a divider 40 for dividing the input signal by a value proportional to the desired mass of the control-column, a first integrator 41 connected to the output of the divider 40 and a second integrator 42 connected to the output of the first integrator, the output of said second integrator being connected through the amplifier 38 and the potentiometer 39 to an input of the amplifier 30.

In the present embodiment the output of the divider 40 and the output of the integrator 41 are also coupled with the inputs of the amplifier 30, that is to say, through potentiometers 43 and 44, respectively. The output signal 45 of the amplifier 38 corresponds, as will be evident after the foregoing, to the difference between the desired and the measured positions of the control-column 1. The signals 46 and 47 applied to the potentiometers 43 and 44 respectively serve to stimulate a quick response to changes of the system.

The coupling analogon 33 is constructed in the form of a first combining circuit 48, the first input of which is connected through a non-linear circuit 63 to the output of the second integrator 42. The analogon 132 comprises a second combining circuit 49, the output of which is connected to the input of the divider 40 and a first input of which is connected to the force-electric signal converter 26 and a second input of which is connected to the output of the first combining circuit 48. The output of the first combining circuit 48 is connected through a non-linear simulation circuit 56 corresponding to the circuit 51 to be described hereinafter to the third combining circuit 50 and through a second, non-linear circuit 64 controllable by the output signal of the second integrator to the second combining circuit 49.

The unit 35 comprises a third combining circuit 50, one input of which is coupled with the output of the first combining circuit 48 and the second input of which is connected to the output of the computer 36 and a second order circuit, the input of which is connected to the output of the third combining circuit 50 and the output of which is connected to an input of the computer and a second input of the first combining circuit.

The said second order circuit comprises a simulation circuit 51, which only provides an output signal when the absolute value of the input signal exceeds a preselected value, whilst the sign of the output signal is uniquely related with the sign of the input signal and said preselected value corresponds to a static friction. The simulation circuit 51 comprises a negative feedback circuit formed by a differentiator 52, an adjustable amplifier 53 and a difference amplifier 54. With regard to the transfer function of the simulation circuit it is noted that the dead band and the slope are both independently adjustable. The dead band corresponds to the static friction and the slope to the reciprocal value of the damping.

The attenuator 53 serves to setting the mass $K_2$ of the steering surface. The output of the simulation circuit 51 is connected to the input of an integrator 55, the output of which is coupled with said input of the computer and with said second input of the first combining circuit 48.

The output signal of the second integrator 42 is furthermore applied to a further input of the computer 36. A further output of the computer provides $F_{syst.2}$ 19, which signal is applied through the input 61 to the second combining circuit 49. To the computer are applied in general various "ideal", i.e. desired or calculated position signals, that is to say, not from, for example, the position pick-up 37, since the latter provides a realistic, non-ideal position signal. The signal 9 at the output of the integrator 55 is also such a signal, that is to say, the "position" of the analogon 34, 35.

The two inputs of a fourth combining circuit 65 are connected to the output of the first integrator 41 and to the output of the simulation circuit 51 respectively, whilst the output is connected to an input of the first combining circuit 48. The amplification of the circuit 65, which may be adjustable, represents the damping of the coupling.

At the output of the non-linear circuit 56 is available a signal 57 which corresponds to the force $F_1 = F_2$. This signal may be imagined to the split up from the branching 58 into a signal 59 corresponding to $F_1$ and an identical signal 60 corresponding to $F_2$.

In the present embodiment the second combining circuit 49 is provided with a further input 61, to which the computer 36 can apply a signal 19 corresponding to $F_{syst.1}$. The signal 9 at the output of the integrator 55 corresponds to $x_2$. The signal 13 at the output of the computer 36 corresponds to $F_{syst.2}$. The signal 9 corresponds to the position of the analogon, that is to say to the desired position of the control-column.

Figure 2:
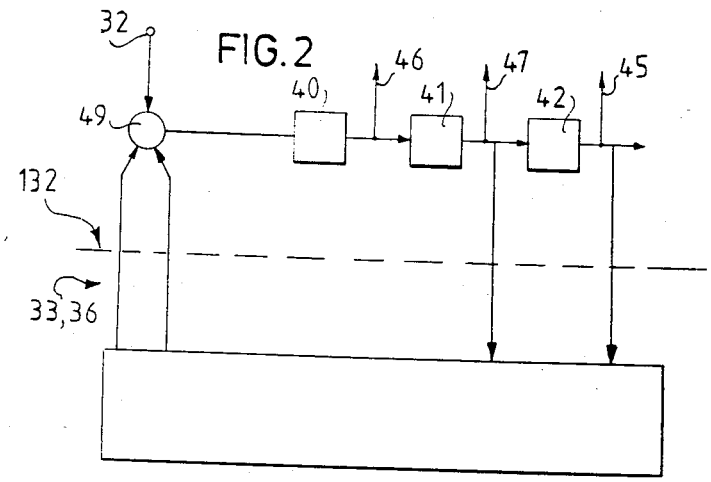
FIG. 2 shows a part of that prior art flight simulator to which the invention is directed.

FIG. 2 shows the part of the circuit according to FIG. 1, to which the invention relates. In FIG. 2 the same reference symbols are used and the several parts will not again be mentioned and discussed. A reference to the combining circuit 49, the divider 40, the integrator 41 and the integrator 42 may suffice. As also may appear with reference to FIG. 1, an exchange of signals takes place between the analogon 132 and the analogon 33 with computer 36, said last-mentioned elements are considered as "the computer" in a broader sense. In the prior art according to FIG. 1 the analogon 33 is engineered in an analogue fashion, in the technique according to the invention the implementation is digital. Anticipating to FIGS. 3 and 4 now already it is remarked that an analogue assembly according to the prior art in FIGS. 3 and 4 is referred to with the same reference number, having an accent added to it.

Figure 3:
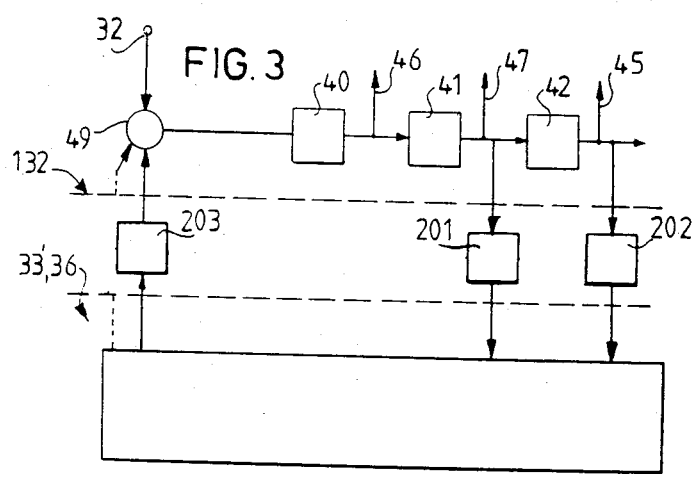
FIG. 3 shows a second embodiment thereof.

FIG. 3 shows an embodiment, in which the output of the analogue first integrator 41 is, through an analogue/digital-converter 201 connected with the unit 33', 36, which is, in this embodiment, engineered in a full digital fashion, whilst the output of the analogue second integrator 42 is connected through an analogue/digital-converter 202 with that unit 33', 36. An output of unit 33', 36 is through a digital/analogue-converter 203 connected to an input of the combining circuit 49.

Figure 4:
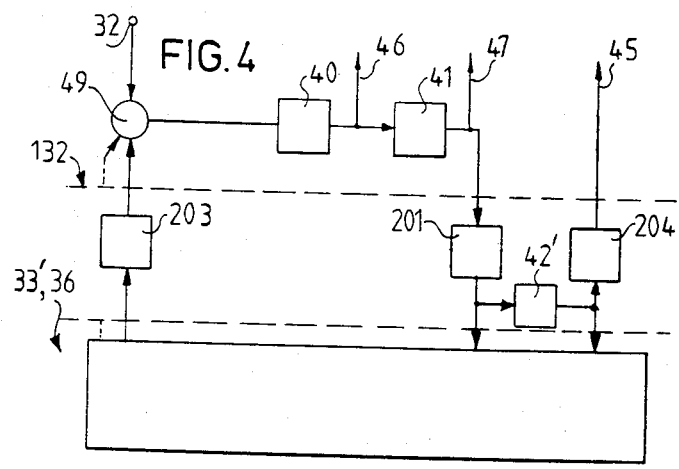
FIG. 4 shows a third embodiment thereof.

The preferred embodiment according to FIG. 4 is deviating from the embodiment according to FIG. 3 in that the analogue integrator 42 is replaced by a digital integrator 42', having its input connected with the output of the analogue/digital-converter 201 and its output connected with the related input of unit 33', 36. Also its output is connected with the input of a digital/analogue converter 204, the output of which is functionally corresponding with the output of analogue integrator 42 according to FIG. 3, referred to in the figures with reference numeral 45.

The difference between FIGS. 3 and 4 will be clear: quantization-noise at the output of the integrator 202 is suppressed for a very substantial part by using a filtered version of the output signal of analogue/digital-converter 201, due to which the quantization-noise present therein is suppressed by 6 dB/octave.

Figure 5:
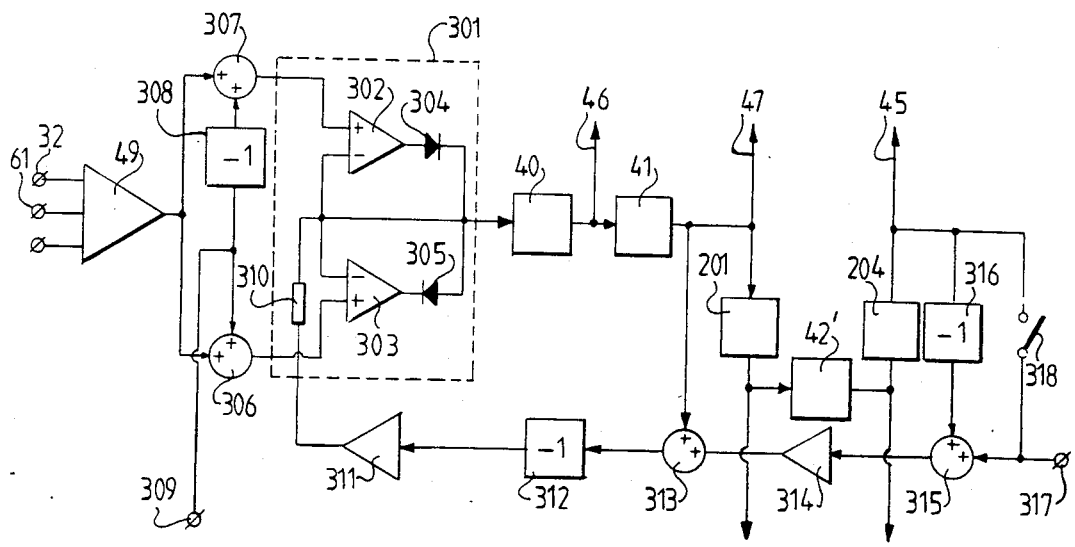
FIG. 5 shows the simulator in a preferred embodiment of the invention.

FIG. 5 shows a circuit taking the same place as block 132 in FIG. 1 and FIG. 4. Corresponding elements are referred to with the same reference numerals as in those FIGS. 1 and 4 and will not be discussed further.

The outline 301 shown in interrupted lines is a controllable limiter. It comprises two operational amplifiers 302 and 303, provided with negative feedback by means of diodes 304, 305, respectively, arranged between the output and the inverting input of the related operational amplifier. This diode circuit, known per se, provides for an idealized diode operation in an ample signal range.

The output signal of combining circuit 49 is supplied to two summing circuits 306, 307, respectively, the respective second inputs of which are directly and through an inverter 308, respectively, connected with an adjusting signal input 309, to be supplied with a signal corresponding to the friction level. The output of summing circuit 306 is connected to the non-inverting input of operational amplifier 303. The output of summing circuit 307 is connected with the non-inverting input of operational amplifier 302.

The output of limiter 301, namely the junction between diodes 304 and 305, is connected with the input of divider 40 and a resistor 310, the other side of which is connected with the output of an amplifier 311, supplied with an input signal through an inverter 312 of a summing circuit 313, the one input of which is connected with the output of the first integrator and the second input of which is connected with an amplifier 314, the input of which is connected with the output of a summing circuit 315, the one input of which is connected through an inverter 316 with the output of the digital/analogue converter 204, and therefore with the output of the second integrator 201, 42', 204.

The second input of summing circuit 315 is connected with an input terminal 317 serving for receiving an input signal corresponding with a "position".

Figure 6:
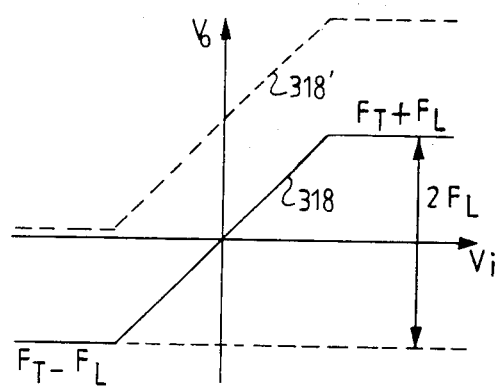
FIG. 6 shows a graph for explanation thereof.

FIG. 6 shows the transfer function of the variable limiter 301. The abscissa corresponds to $V_i$, the input voltage, whilst the ordinate corresponds to $V_o$, the output voltage.

At the output of the summing circuit 49 a totalforth signal $F_T$ is present, that can be considered as reference level. At input 309 a signal is present corresponding with the friction level $F_L$. It will now be clear that at the non-inverting input of the operational amplifier 303 a signal is present having the value $F_T + F_L$, whilst at the non-inverting input of operational amplifier 302 a signal is present having the value $F_T - F_L$. These values $F_T + F_L$ and $F_T - F_L$ correspond with an upper limit and a lower limit, respectively, of the voltage to be supplied by the limiting circuit 301, as is shown in the transfer function according to FIG. 6. It will also be clear that the difference between both limits has the value $(F_T + F_L) - (F_T - F_L) = 2 F_L$, which is also indicated in FIG. 6. Variation of the desired friction level can, correspondingly, be effected by chosing the distance between both limits by means of a suitable choice of the signal at the input 309.

By means of varying the output voltage $F_T$ of the summing circuit 49 it can be realized that the total transfer function 318 of the limiter moves up and down. This corresponds with the physical reality in case of a friction. As an explanation: an object placed on a surface and being shiftable over that surface, only starts to move after exceeding a certain minimum force. In FIG. 6 this has been indicated by a shifting in upward direction of the transfer function 318 to the function 318'. Thereto a $F_T$ has been necessary, which was just a little larger than $F_L$.

The acceleration signal at the output of the divider 40 has the value of the product of the amplification factor of amplifier 311 and the velocity signal, i.e. the output signal of the first integrator 41, provided it is between the limits of limiter 301. In rest the velocity signal has the value 0, due to which also the acceleration signal has the value 0.

If $F_T+F_L$ is smaller than 0, the acceleration signal equals $(F_T+F_L)/m$, as the velocity signal is not equal 0 and minus the amplification factor of amplifier 311 times the velocity signal is positive.

If $F_T-F_L$ is larger than 0, the acceleration signal is $(F_T-F_L)/m$, as the velocity signal is not equal 0 and minus the amplification factor of the amplifier 311 times the velocity signal is negative.

By the way, in FIG. 6 the starting point was that the friction levels for displacement in both directions are equal. For a realistic friction simulation for application in flight simulators and the like this will be correct. However, one can think of applications, in which a friction has to be simulated having deviating values in both directions. Thereto in the inputs of both rectifiers suitable amplifiers/attenuators can be arranged, or even use may be made of two different inputs corresponding to input 309.

Amplifier 314 has in an experimental set-up a gain factor of about ten.

By supplying a programmable, as the case may be, and variable input signal to the "position"-input 317, the first element, therefore in this embodiment the control-column 1, can be brought in any desired position, provided the switch 318 arranged between the output of the digital-analogue converter 204 and input 317 is in its opened condition. In this case it is a condition that the force signal at the output of the sum circuit 49 is smaller than the friction signal at input 309. In this condition the system behaves as a position-follower having a force-limitation to the value of the friction as adjusted, i.e. the signal at input 309.

By recording signals occurring during training sessions with the simulator the whole situation can be replayed by applying to input 317 the related signals.

Also mechanical blocks in the system can be detected.

A third possibility is simulating a blocking or "jam" of the control-column, in which case the force limiting ensures the user's safety.

We claim:

1. In a flight simulator or similar system which includes a manually-operated control member and a servo means connected thereto for acting and reacting on the control member to simulate response of a controlled member such as a control surface under flight conditions, said servo means including a servo valve, amplifier means for controlling the servo valve in response to a plurality of inputs thereto, computer means for producing flight simulating signals, electrical analogue means by producing output signals feeding the amplifier means and including a combining circuit, a divider and first and second integrators, all in series, the combining circuit having an input from the computer means which represents simulated flight conditions, pick-up means having an output which represents manual input force applied to the control member, a second amplifier having the output of the pick-up means connected as an input thereto and the output of the second integrator as an input thereto and having an output representing position error of the control member which is connected to the amplifier means, the divider dividing the output of the combining circuit by a value representing the mass of the control member to produce a control member acceleration-related signal applied to the first integrator whereby the output of the first integrator is a control member velocity-related signal and the output of the second integrator is a control member position-related signal, the acceleration-related signal and the velocity-related signal being connected as inputs to the amplifier means, the improvement comprising controllable limiter means connected in negative feedback relation from the output of the first integrator to the input to the divider for simulating the mechanical Coulomb friction of the control member, and control means connected between the combining circuit and the limiter for providing sum and difference signals, respectively, of the output of the combining circuit and an external friction signal to the limiter.

2. In a flight simulator as defined in claim 1 wherein the limiter includes an amplifier.

3. In a flight simulator as defined in claim 2 wherein the limiter includes two diode circuits in series and reverse biased by the sum and difference signals, the junction between the diodes of the diode circuits being connected to the input of the divider and coupled with the output of the first integrator.

4. In a flight simulator as defined in claim 3 wherein each diode circuit includes an operational amplifier, each having an input connected to the junction with one of the operational amplifiers having another input connected to the sum signal and the other of the operational amplifiers having another input connected to the difference signal.

5. In a flight simulator as defined in claim 4 wherein the computer means is of the digital type, an analogue/digital converter connecting the output of the first integrator with the computer means, and a digital/analogue converter connecting the computer means to the combining circuit.

6. In a flight simulator as defined in claim 5 wherein the second integrator is of the digital type connected to the output of the analogue/digital converter, and including a second digital/analogue converter connecting the output of the second integrator to the second amplifier.

7. In a flight simulator as defined in claim 6 including a summing circuit having the output of the first integrator as one input and the inverted output of the second integrator as a second input and coupled with the junction, and a further summing circuit for addition to the inverted output of the second integrator.

8. In a flight simulator as defined in claim 1 wherein the limiter includes two diode circuits in series and reverse biased by the sum and difference signals, the junction between the diodes of the diode circuits being connected to the input of the divider and coupled with the output of the first integrator.

9. In a flight simulator as defined in claim 8 wherein each diode circuit includes an operational amplifier, each having an input connected to the junction with one of the operational amplifiers having another input connected to the sum signal and the other of the operational amplifiers having another input connected to the difference signal.

10. In a flight simulator as defined in claim 1 wherein the computer means is of the digital type, an analogue/digital converter connecting the output of the first integrator with the computer means, and a digital/analogue converter connecting the computer means to the combining circuit.

11. In a flight simulator as defined in claim 10 wherein the second integrator is of the digital type connected to the output of the analogue/digital converter, and including a second digital/analogue converter connecting the output of the second integrator to the second amplifier.

12. In a flight simulator as defined in claim 11 including a summing circuit having the output of the first integrator as one input and the inverted output of the second integrator as a second input and coupled with the junction, and a further summing circuit for addition to the inverted output of the second integrator.

13. A flight simulator comprising a flight-simulation computer, at least one control element, servo-means coupled with the or each element and including an amplifier, said computer being coupled with the amplifier through an electric analog representing the relevant mechanical properties of the element concerned, the electric analog comprising a divider for dividing its input signal by a value proportional to the desired mass of the element, the output of the divider being coupled with as third input of the amplifier, a first integrator connected to the output of the divider, and a second integrator connected to the output of the first integrator, the output of the second integrator being coupled with the input of the amplifier, the improvement comprising controllable limiter means connected in negative feedback relation from the output of the first integrator to the input to the divider for simulating the mechanical Coulomb friction of the control member, and control means connected between the amplifier and the limiter for providing sum and difference signals, respectively, of the output of the amplifier and an external friction signal to the limiter.

14. A flight simulator as defined in claim 13 wherein the limiter includes two diode circuits in series and reverse biased by the sum and difference signals, the junction between the diodes of the diode circuits being connected to the input of the divider and coupled with the output of the first integrator.

15. In a flight simulator as defined in claim 14 wherein each diode circuit includes an operational amplifier, each having an input connected to the junction with one of the operational amplifiers having another input connected to the sum signal and the other of the operational amplifiers having another input connected to the difference signal.

16. A flight simulator as defined in claim 15 wherein the computer is of the digital type, an analogue/digital converter connecting the output of the first integrator with the computer, and a digital/analogue converter connecting the computer to the amplifier.

17. A flight simulator as defined in claim 16 wherein the second integrator is of the digital type connected to the output of the analogue/digital converter, and including a second digital/analogue converter connected to the output of the second integrator.

18. A flight simulator as defined in claim 17 including a summing circuit having the output of the first integrator as one input and the inverted output of the second integrator as a second input and coupled with the junction, and a further summing circuit for addition to the inverted output of the second integrator.

19. A flight simulator as defined in claim 13 wherein the computer is of the digital type, an analogue/digital converter connecting the output of the first integrator with the computer, and a digital/analogue converter connecting the computer to the amplifier.

20. A flight simulator as defined in claim 19 wherein the second integrator is of the digital type connected to the output of the analogue/digital converter, and including a second digital/analogue converter connecting the output of the second integrator to the second amplifier.

* * * * *